United States Patent
Bohling et al.

(10) Patent No.: US 9,745,478 B2
(45) Date of Patent: *Aug. 29, 2017

(54) PIGMENTED PAINT FORMULATION WITH A PHOSPHORUS ACID FUNCTIONALIZED LATEX BINDER AND AN ASSOCIATIVE THICKENER

(71) Applicant: Rohm and Haas Company, Philadelphia, PA (US)

(72) Inventors: James C. Bohling, Lansdale, PA (US); Arnold S. Brownell, Lansdale, PA (US); Jihui Guo, North Wales, PA (US); Kevin J. Henderson, Phoenixville, PA (US); Ericka Lynn Killian, Collegeville, PA (US); John J. Rabasco, Allentown, PA (US); Daniel A. Saucy, Harleysville, PA (US); Jordan Stracke, Spring City, PA (US)

(73) Assignee: Rohm and Haas Comopany, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/264,659

(22) Filed: Sep. 14, 2016

(65) Prior Publication Data

US 2017/0081529 A1    Mar. 23, 2017

Related U.S. Application Data

(60) Provisional application No. 62/219,883, filed on Sep. 17, 2015.

(51) Int. Cl.
| | | |
|---|---|---|
| *C08L 3/00* | (2006.01) | |
| *C09D 7/00* | (2006.01) | |
| *C09D 7/12* | (2006.01) | |
| *C09D 133/08* | (2006.01) | |
| *C09D 133/12* | (2006.01) | |
| *C09D 5/02* | (2006.01) | |
| *C09D 151/00* | (2006.01) | |
| *C08K 9/04* | (2006.01) | |
| *C08L 75/04* | (2006.01) | |
| *C08K 3/22* | (2006.01) | |

(52) U.S. Cl.
CPC .............. *C09D 7/002* (2013.01); *C09D 5/024* (2013.01); *C09D 5/028* (2013.01); *C09D 7/004* (2013.01); *C09D 7/12* (2013.01); *C09D 7/1225* (2013.01); *C09D 133/08* (2013.01); *C09D 133/12* (2013.01); *C09D 151/003* (2013.01); *C08K 9/04* (2013.01); *C08K 2003/2241* (2013.01); *C08L 75/04* (2013.01)

(58) Field of Classification Search
CPC ......... C09D 7/002; C09D 7/12; C09D 133/12
See application file for complete search history.

(56) References Cited

U.S. PATENT DOCUMENTS

| | | | |
|---|---|---|---|
| 4,079,028 A | 3/1978 | Emmons et al. | |
| 4,155,892 A | 5/1979 | Emmons et al. | |
| 7,081,488 B2 | 7/2006 | Bardman et al. | |
| 7,179,531 B2 | 2/2007 | Brown et al. | |
| 8,034,869 B2 | 10/2011 | Bobsein et al. | |
| 8,710,133 B2 | 4/2014 | Bohling et al. | |
| 8,907,004 B2 | 12/2014 | Henderson et al. | |
| 9,303,161 B2 * | 4/2016 | Bohling ................. C08F 2/001 |
| 9,505,944 B2 * | 11/2016 | Bohling ............... C09D 131/04 |
| 2002/0096088 A1 | 7/2002 | Bardman et al. | |
| 2004/0054063 A1 | 3/2004 | Brown et al. | |
| 2012/0024610 A1 | 2/2012 | Woolmer | |
| 2012/0322936 A1 | 12/2012 | Li et al. | |
| 2014/0221560 A1 | 8/2014 | Bohling et al. | |
| 2015/0000546 A1 | 1/2015 | Kotefski et al. | |
| 2015/0005446 A1 | 1/2015 | Bohling et al. | |
| 2015/0011695 A1 | 1/2015 | Bohling et al. | |
| 2015/0361291 A1 | 12/2015 | Brownell et al. | |
| 2016/0040004 A1 | 2/2016 | Brownell et al. | |
| 2017/0081547 A1* | 3/2017 | Bohling .................. C09D 5/00 |

OTHER PUBLICATIONS

DOW; Acrysol Rheology Modifiers, pp. 9-13, 2013.
Klopman, et al.; Computer Automated Log P Calculations Based on an Extended Group Contribution Approach, J Chem Inf Comput Sci, vol. 34, pp. 752-781, 1994.

* cited by examiner

*Primary Examiner* — Hannah Pak
(74) *Attorney, Agent, or Firm* — Reid S. Willis

(57) ABSTRACT

The present invention relates to a composition comprising an aqueous dispersion of an associative thickener having a hydrophobic portion with a calculated log P in the range of from 2.7 to 5.0; and composite particles comprising phosphorus acid functionalized polymer particles adsorbed to the surfaces of $TiO_2$ particles; wherein the phosphorus acid functionalized polymer particles have a core-shell morphology wherein the core protuberates from the shell. The composition of the present invention provides formulators with flexibility in their use of low and mid shear rate thickeners to balance paint performance properties.

11 Claims, No Drawings

PIGMENTED PAINT FORMULATION WITH A PHOSPHORUS ACID FUNCTIONALIZED LATEX BINDER AND AN ASSOCIATIVE THICKENER

BACKGROUND OF THE INVENTION

The present invention relates to a pigmented paint formulation containing a phosphorus acid functionalized latex binder and an associative thickener that is designed to give formulators flexibility in targeting a desired Stormer (KU) viscosity of the composition, particularly when elevated ICI viscosity is desired.

Titanium dioxide ($TiO_2$) is widely used to create opacity in paint formulations due to its high index of refraction. The rapid rise in the cost in $TiO_2$ has led to the search for more efficient ways to reduce concentrations of this pigment without sacrificing hiding. Efficiency can be achieved by improving the spacing between $TiO_2$ particles, for example, by adsorbing phosphorus acid functionalized emulsion polymer particles to the surfaces of the $TiO_2$ particles. (See, for example, U.S. Pat. Nos. 7,081,488, 7,179,531, and US 2015/000546 A1). The resulting composite structures exhibit an increase in viscosity efficiency, which may adversely affect a formulator's ability to tailor the KU rheological response to a desired viscosity using a traditional thickener such as a hydrophobically modified ethylene oxide urethane (HEUR) polymer thickener. This consequence appears to be especially acute where the adsorbing polymer particles exhibit a so-called acorn morphology, where the adsorbing portion of the particle is confined to a small protuberance off the surface of a larger spherical particle.

It would therefore be desirable to discover a composition that provides both efficient use $TiO_2$ and KU building capability. Such a composition would facilitate viscosity adjustment of a paint formulation at high shear rates in the presence of composite particles without exceeding viscosity targets at low and mid shear rates, and would have the added benefit of increased flexibility in the use of low and mid shear rate thickeners to balance other paint performance properties.

SUMMARY OF THE INVENTION

The present invention addresses a need in the art by providing a composition comprising an aqueous dispersion of a) from 0.02 to 2 weight percent, based on the weight of the composition, of an associative thickener having a hydrophobic portion with a calculated log P in the range of from 2.7 to 5.0; and b) from 5 to 60 weight percent, based on the weight of the composition, of composite particles comprising phosphorus acid functionalized polymer particles adsorbed to the surfaces of $TiO_2$ particles wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 5.0; wherein the phosphorus acid functionalized polymer particles have a core-shell morphology wherein the core protuberates from the shell. The composition of the present invention provides formulators with flexibility in their use of low and mid shear rate thickeners to balance paint performance properties.

DETAILED DESCRIPTION OF THE INVENTION

The present invention is a composition comprising an aqueous dispersion of a) from 0.02 to 2 weight percent, based on the weight of the composition, of an associative thickener having a hydrophobic portion with a calculated log P in the range of from 2.7 to 5.0; and b) from 5 to 60 weight percent, based on the weight of the composition, of composite particles comprising phosphorus acid functionalized polymer particles adsorbed to the surfaces of $TiO_2$ particles; wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 5.0; wherein the phosphorus acid functionalized polymer particles have a core-shell morphology wherein the core protuberates from the shell.

As associative thickener comprises a water soluble polymeric backbone endcapped with terminal or internal hydrophobic groups or both. Preferably, the concentration of the associative thickener is from 0.1 to 1 weight percent. Examples of suitable backbones include polyether, polymethacrylamide, polysaccharide, or polyvinyl backbones, preferably, a polyether backbone. More preferably, the associative thickener is a hydrophobically modified alkylene oxide urethane polymer, most preferably a hydrophobically modified ethylene oxide urethane polymer (a HEUR). This polymer may be prepared by contacting together under reactive conditions a) a diisocyanate; b) a water-soluble polyalkylene glycol; and c) a capping agent. Examples of suitable diisocyanates include 1,4-tetramethylene diisocyanate, 1,6-hexamethylene diisocyanate (HDI), 2,2,4-trimethyl-1,6-diisocyanatohexane, 1,10-decamethylene diisocyanate, 4,4'-methylenebis(isocyanatocyclohexane), 2,4'-methylenebis(isocyanatocyclohexane), 1,4-cyclohexylene diisocyanate, 1-isocyanato-3-isocyanatomethyl-3,5,5-trimethylcyclohexane (IPDI), m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers. As used herein, the term propylene oxide refers to either a polymer having $-(OCH_2CH_2CH_2)-$ and/or $-(OCH(CH_3)CH_2)-$ repeating groups.

Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, Mich.).

A branched hydrophobically modified alkylene oxide urethane polymer may be prepared, for example, by reacting a compound with at least three isocyanate groups with a stoichiometric excess of a water-soluble polyalkylene glycol, followed by reaction of the intermediate with a stoichiometric excess of a diisocyanate to form a branched polyurethane polymer with isocyanate groups, followed by capping of the isocyanate groups with a capping agent. Examples of preferred compounds with three isocyanate groups include cyanurate and biuret trimers such as HDI isocyanurate (trimer), and IPDI isocyanurate (trimer), as illustrated:

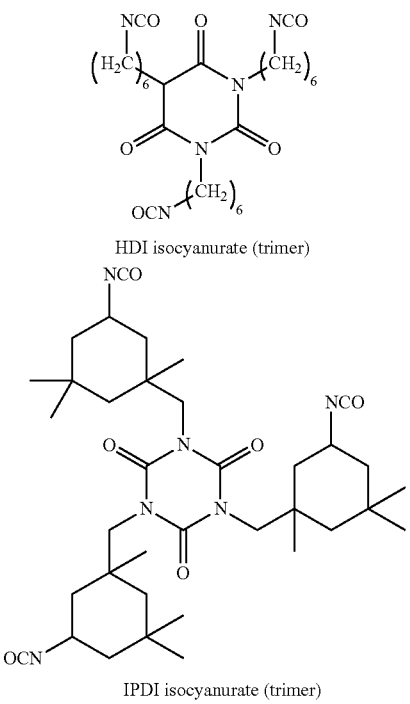

HDI isocyanurate (trimer)

IPDI isocyanurate (trimer)

The hydrophobic portion from which calculated log P (c Log P) is derived is characterized by either of the following formulas:

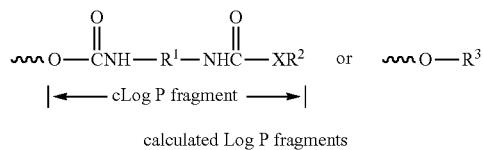

calculated Log P fragments where the oxygen atom is covalently bonded to the polymer backbone (squiggly line) through a saturated carbon atom; where $R^1$ is a divalent group and $R^2$ and $R^3$ are monovalent groups selected to achieve the desired c Log P.

Preferably, $R^1$ is a $C_4$-$C_{14}$ alkyl, a $C_5$-$C_8$ cycloalkyl, or a combination of $C_1$-$C_9$ alkyl and $C_5$-$C_7$ cycloalkyl groups.

Preferably, $R^2$ is a $C_3$-$C_{10}$ alkyl, a $C_5$-$C_8$ cycloalkyl, or a benzyl group; X is O or $NR^{2\prime}$ where $R^{2\prime}$ is H or a monovalent group selected to achieve the desired c Log P. Preferably $R^{2\prime}$ is H, a $C_2$-$C_6$-alkyl, or a $C_5$-$C_8$ cycloalkyl group.

$R^3$ is preferably a $C_7$-$C_{11}$-alkyl, a dibenzylamino-$C_2$-$C_5$-alkyl, a di-$C_4$-$C_6$-alkylamino-$C_1$-$C_4$-alkyl, a $C_6$-$C_8$-alkylphenyl group.

The c Log P is determined using ChemBioDraw Ultra 13.0 (PerkinElmer), which uses a chemical fragment algorithm method for assessing the partition coefficient of a molecule based on its constituent parts.

Examples of pairings of $R^1$ and $R^2$ groups within the scope of the desired c Log P range are as follows:

| $R^1$ | $R^2$ | $R^{2\prime}$ | X | cLog P |
|---|---|---|---|---|
| -$H_{12}$MDI- | $CH_3(CH_2)_3$— | — | O | 4.68 |
| -$H_{12}$MDI- | $CH_3(CH_2)_2$— | — | O | 4.15 |
| -$H_{12}$MDI- | benzyl | — | O | 4.86 |
| -IPDI- | benzyl | — |  | 3.87 |
| -IPDI- | $CH_3(CH_2)_5$— | — | O | 4.75 |
| -IPDI- | $CH_3(CH_2)_4$— | — | O | 4.22 |
| -IPDI- | $CH_3(CH_2)_3$— | — | O | 3.69 |
| -HDI- | $CH_3(CH_2)_8$— | — | O | 4.87 |
| -HDI- | $CH_3(CH_2)_7$— | — | O | 4.34 |
| -HDI- | $CH_3(CH_2)_6$— | — | O | 3.81 |
| -HDI- | $CH_3(CH_2)_5$— | — | O | 3.29 |
| -HDI- | $CH_3(CH_2)_4$— | — | O | 2.76 |
| -HDI- | $CH_3(CH_2)_3$— | $CH_3(CH_2)_3$— | $NR^{2\prime}$ | 3.16 |
| -HDI- | $CH_3(CH_2)_4$— | $CH_3(CH_2)_4$— | $NR^{2\prime}$ | 3.76 |
| -HDI- | $CH_3(CH_2)_5$— | H | $NR^{2\prime}$ | 2.90 |
| -HDI- | $CH_3(CH_2)_6$— | H | $NR^{2\prime}$ | 3.42 |
| -HDI- | $CH_3(CH_2)_7$— | H | $NR^{2\prime}$ | 3.95 |
| -HDI- | benzyl | benzyl | $NR^{2\prime}$ | 3.42 |
| -HDI- | cyclohexyl | cyclohexyl | $NR^{2\prime}$ | 4.05 |
| -$H_{12}$MDI- | benzyl | $CH_3$— | $NR^{2\prime}$ | 4.37 |
| -$H_{12}$MDI- | cyclohexyl | H | $NR^{2\prime}$ | 4.74 |
| -IPDI- | $CH_3(CH_2)_3$— | $CH_3(CH_2)_3$— | $NR^{2\prime}$ | 4.62 |
| -IPDI- | $CH_3(CH_2)_5$— | H | $NR^{2\prime}$ | 4.36 | where -$H_{12}$MDI- refers to fragments of isomers of methylenebis(isocyanatocyclohexane):

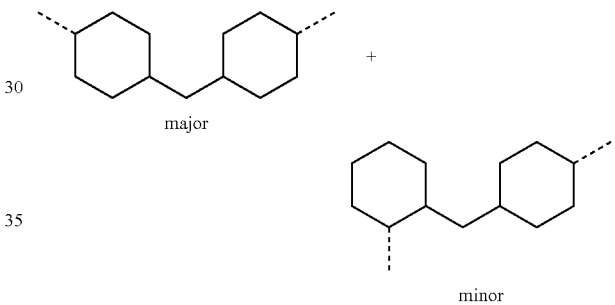

major minor

-IPDI- refers to a fragment of 1-isocyanato-3-isocyanatomethyl-3,5,5-trimethylcyclohexane:

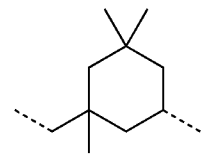

-HDI- refers to a fragment of hexamethylene diisocyanate:

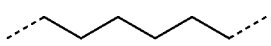

where the dotted lines represent the points of attachment of $R^1$ to the NH groups.

-$H_{12}$MDI-, -IPDI-, and -HDI- are preferred $R^1$ groups.

Examples of suitable —$OR^3$ groups include —O-n-undecyl (c Log P=4.42), —O-n-decyl (c Log P=3.89), —O-n-nonyl (c Log P=3.36), —O-n-octyl (c Log P=2.83), —O-2-ethylhexyl (c Log P=2.70), —O-3,5,5-trimethylhexyl (c Log P=2.97), —O-3,7-dimethyloctyl (c Log P=3.63), —O-dibenzylaminoethyl (c Log P=3.10), —O-2-propylheptyl (c Log P=3.76), —O-diamylaminoethyl (c Log P=3.76), —O-n-octylphenyl (c Log P=4.77), and —O-2,6-dimethylheptyl (c Log P=3.10).

The preferred c Log P of the fragment depends on the volume solids content of the composition. When the volume solids is from 30 to 36 volume percent, the c Log P of the fragment is from 4.0, and preferably from 4.2, to 5.0, preferably to 4.8, and more preferably to 4.6; when the volume solids is from 36 to 44 volume percent, the c Log P of the fragment is from 2.7, preferably from 3.0, more preferably from 3.5, and most preferably from 4.0, to 5.0, preferably to 4.8, and more preferably to 4.6.

The phosphorus acid functionalized polymer particles have an acorn morphology; that is to say, a smaller core portion protuberating from a larger shell portion. An aqueous dispersion of the phosphorus acid functionalized polymer particles with acorn morphology—also known as a pre-composite polymer—can be prepared by variety of emulsion polymerization techniques, such as those disclosed in US 2015/0005446 A1. In a preferred method, a stable aqueous dispersion of preformed polymer particles are contacted with a monomer emulsion under emulsion polymerization conditions to form as stable aqueous dispersion of preformed particles protuberating from polymer particles arising from the polymerization of the monomer emulsion. In this preferred method, the preformed polymer particles, which ultimately constitute the core, preferably comprise, based on the weight of the preformed polymer particles: a) from 2 to 15 weight percent structural units of a phosphorus acid monomer or a salt thereof; b) from 0.2 to 20 weight percent structural units of a carboxylic acid monomer or a sulfur acid monomer or a salt thereof or a combination thereof; c) from 0.1 to 30 weight percent structural units of a multiethylenically unsaturated monomer; and d) from 50 to 95 weight percent structural units of a polymerizable ethylenically unsaturated bulk monomer.

The shell preferably comprises, based on the weight of the shell: a1) from 0.1 to 4 weight percent structural units of a sulfur acid monomer or a salt thereof; and b1) from 80 to 99 weight percent structural units of a polymerizable ethylenically unsaturated bulk monomer. The shell preferably comprises less than 1, more preferably less than 0.1 weight percent structural units of a phosphorus acid monomer or salt thereof; and less than 2 weight percent structural units of a carboxylic acid monomer or salt thereof. The weight-to-weight ratio of the shell to the core is preferably in the range of 3:1 to 50:1.

As used herein, the term "structural unit" of the named monomer, refers to the remnant of the monomer after polymerization. For example, a structural unit of methyl methacrylate is as illustrated:

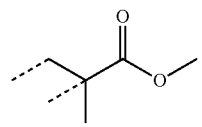

structural unit of methyl methacrylate
where the dotted lines represent the points of attachment of the structural unit to the polymer backbone.

In this preferred embodiment of phosphorus acid functionalized polymer particles, the protuberating core preferably comprises from 5 to 10 weight percent structural units of a phosphorus acid monomer or a salt thereof. Examples of suitable phosphorus acid monomers include phosphonates and dihydrogen phosphate esters of an alcohol in which the alcohol contains or is substituted with a polymerizable vinyl or olefinic group. Preferred dihydrogen phosphate esters are phosphates of hydroxyalkyl(meth)acrylates, including phosphoethyl methacrylate and phosphopropyl methacrylates, with phosphoethyl methacrylate being especially preferred. "Phosphoethyl methacrylate" (PEM) is used herein to refer to the following structure:

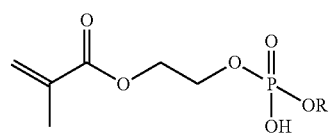

where R is H or

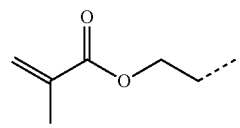

wherein the dotted line represents the point of attachment to the oxygen atom.

The core preferably comprises from 0.5, more preferably from 1, to preferably 4, and more preferably to 3 weight percent structural units of a carboxylic acid monomer or a sulfur acid monomer or a salt thereof or a combination thereof. Suitable carboxylic acid monomers include acrylic acid, methacrylic acid, itaconic acid, and salts thereof, with acrylic acid or methacrylic acid being preferred; suitable sulfur acids include sulfoethyl methacrylate, sulfopropyl methacrylate, styrene sulfonic acid, vinyl sulfonic acid, and 2-acrylamido-2-methyl propanesulfonic acid, and salts thereof. Preferably, however, the core contains less than 0.2 weight percent, more preferably less than 0.1 weight percent, and most preferably 0 weight percent structural units of a sulfur acid monomer. A preferred concentration of structural units of acrylic acid or methacrylic acid is from 0.1, more preferably from 0.5, to 3 weight percent, based on the weight of the core.

The core preferably comprises from 0.3, more preferably from 0.5 weight percent to preferably 5, more preferably to 3 weight percent structural units of a multiethylenically unsaturated monomer. An example of a preferred multiethylenically unsaturated monomer is a diethylenically unsaturated monomer such as allyl methacrylate.

As used herein, a polymerizable ethylenically unsaturated bulk monomer refers to a styrene monomer or an acrylate monomer or a combination thereof. The total concentration of the polymerizable ethylenically unsaturated bulk monomer in the core is from 50 to 95 weight percent, based on the weight of the core. The structural units of polymerizable ethylenically unsaturated bulk monomer in the core are preferably a combination of the following monomers: i) methyl methacrylate, ethyl methacrylate, or styrene or a combination thereof; and ii) ethyl acrylate, butyl acrylate, or 2-ethylhexyl acrylate or a combination thereof. A more preferred combination of bulk monomers is methyl methacrylate or styrene or a combination thereof with ethyl acrylate, butyl acrylate, or 2-ethylhexyl acrylate or a combination thereof, with methyl methacrylate and butyl acrylate being especially preferred.

The core preferably contains structural units of methyl methacrylate or styrene or a combination thereof at a concentration of from 5 weight percent, more preferably from 20 weight percent, to 60 weight percent, more preferably to 40 weight percent, based on the weight of the core; and preferably contains structural units of butyl acrylate, preferably at a concentration of from 35 weight percent, more preferably from 50 weight percent, to 90 weight percent, more preferably to 70 weight percent, based on the weight of the core.

The core preferably has a volume average diameter in the range of from 30 nm, more preferably from 40 nm, to 90 nm, more preferably to 80 nm (as measured by a BI-90 Dynamic Light Scattering Particle Analyzer) and preferably a $T_g$ in the range of from −30° C., more preferably from −20° C., to preferably 60° C., more preferably to 40° C., and most preferably to 20° C., as calculated by the Fox equation.

The shell preferably comprises less than 0.1, more preferably less than 0.01 weight percent structural units of a phosphorus acid monomer, based on the weight of the shell, and preferably less than 0.1, more preferably less than 0.01 weight percent structural units of a multiethylenically unsaturated monomer, based on the weight of the shell. The shell most preferably includes no structural units of a phosphorus acid monomer or a multiethylenically unsaturated monomer.

The polymerizable ethylenically unsaturated bulk monomer used to form the shell preferably comprises i) methyl methacrylate or styrene or a combination thereof; and ii) ethyl acrylate, butyl acrylate, or ethylhexyl acrylate, or a combination thereof.

A preferred combination of structural units of polymerizable ethylenically unsaturated bulk monomers in the shell include 1) methyl methacrylate or styrene or a combination thereof at a concentration preferably in the range of from 35 weight percent to 74.9 weight percent, more preferably to 65 weight percent, and most preferably to 55 weight percent based on the weight of the shell; and 2) structural units of ethyl acrylate, butyl acrylate, or 2-ethylhexyl acrylate or a combination thereof, more preferably structural units of butyl acrylate, preferably at a concentration in the range of from 25 weight percent, more preferably from 45 weight percent to preferably 64.9 weight percent, based on the weight of the shell.

Preferably, the shell comprises from 0.1, more preferably from 0.3 to 4, more preferably to 1.5 weight percent structural units of a sulfur acid monomer or a salt thereof. A preferred sulfur acid monomer is a sodium styrene sulfonate such as sodium 4-vinylbenzenesulfonate, or 2-acrylamido-2-methyl propanesulfonic acid (AMPS), or salts thereof or combinations thereof.

Preferably, the shell comprises less than 1.5 weight percent structural units of a carboxylic acid monomer such as acrylic acid or methacrylic acid, more preferably from 0.1 to 1.5 weight percent structural units of acrylic acid; preferably, the ratio of structural units of the sulfur acid monomer to structural units of carboxylic acid monomer is at least 0.5:1, more preferably at least 1:1, and most preferably at least 5:1. In one embodiment, the shell contains no structural units of carboxylic acid monomer. Preferably, the weight-to-weight ratio of the shell to the core is in the range of from 5:1 to 35:1.

The composition may further comprise a dispersion of polymer particles that do not have a protuberating core but have the same or substantially the same composition as the composition of the shell of the phosphorus acid functionalized polymer particles. In a preferred method of preparing this bimorphological composition, an aqueous dispersion of the first seed polymer particles is advantageously prepared by emulsion polymerization of monomers comprising a) methyl methacrylate or styrene or a combination thereof, preferably methyl methacrylate; b) one or more acrylates selected from the group consisting of ethyl acrylate, butyl acrylate, 2-propylheptyl acrylate, and 2-ethylhexyl acrylate; and c) a phosphorus acid monomer, preferably PEM or a salt thereof. A carboxylic acid monomer or a sulfur acid monomer, or salts thereof or combinations thereof are preferably included in the emulsion polymerization of the first seed polymer particles. A multiethylenically unsaturated monomer such as allyl methacrylate or divinyl benzene is also preferably included in the emulsion polymerization of the first seed polymer particles.

Preferably, the first seed polymer particles comprise, based on the weight of the first seed polymer particles: a) 2 to 12 weight percent structural units of a phosphorus acid monomer or a salt thereof; b) from 0.5 to 20 weight percent structural units of a carboxylic acid monomer or a sulfur acid monomer or a salt thereof or a combination thereof; c) from 0.1 to 30 weight percent structural units of a multiethylenically unsaturated monomer; and d) a sufficient concentration of structural units of one or more polymerizable ethylenically unsaturated bulk monomers so that the pre-formed polymer particles have a $T_g$, as calculated by the Fox equation, in the range of from −50° C., preferably from −40° C., more preferably from −20° C.; to 75° C., preferably to 30° C., and more preferably to 20° C.

More preferably, the first seed polymer particles comprise, based on the weight of the first seed polymer particles: a) 3 to 8 weight percent structural units of PEM or a salt thereof; b) from 1 to 5 weight percent structural units of acrylic acid or methacrylic acid or a salt thereof; c) from 0.2 to 5 weight percent structural units of a multiethylenically unsaturated monomer, more preferably allyl methacrylate or divinyl benzene; d) from 50 to 65 weight percent structural units of butyl acrylate; and e) 25 to 45 weight percent structural units of methyl methacrylate.

The volume average particle size of the first seed polymer particles, as measured by a BI-90 Dynamic Light Scattering Particle Analyzer, is from 40 nm, preferably from 45 nm, more preferably from 55 nm, and most preferably from 60 nm, to 85 nm, preferably to 80 nm.

The aqueous dispersion of the second seed polymer particles is advantageously prepared by emulsion polymerization of from 0.1 to 4 weight a sulfur acid monomer or a salt thereof; from 25 to 75 weight percent methyl methacrylate or styrene or a combination thereof, preferably methyl methacrylate; and from 20 to 70 weight percent butyl acrylate or ethyl acrylate or a combination thereof; preferably butyl acrylate; and less than 1 weight percent, preferably less than 0.5 weight percent, more preferably less than 0.1 weight percent, and most preferably 0 weight percent phosphorus acid monomer, based on the weight of the second seed polymer particles.

A carboxylic acid monomer or a sulfur acid monomer, or salts thereof or combinations thereof are preferably included in the emulsion polymerization of the second seed polymer particles.

Preferably, the second seed monomers comprise, based on the weight of the second seed monomers: a) methyl methacrylate or styrene or a combination thereof; b) one or more acrylate monomers selected from the group consisting of ethyl acrylate, butyl acrylate, 2-propylheptyl acrylate, and 2-ethylhexyl acrylate; and c) less than 0.1 weight percent of a phosphorus acid monomer, based on the weight of the monomers.

More preferably, the second seed monomers comprise, based on the weight of the monomers: a) from 40, more preferably from 45, to 60, more preferably to 55 weight percent butyl acrylate or 2-ethylhexyl acrylate or a combination thereof; b) from 40, more preferably from 45, to 60, more preferably to 55 weight percent methyl methacrylate or styrene or a combination thereof; c) from 0.1 to 5 weight percent of acrylic acid or methacrylic acid or sodium 4-vinylbenzenesulfonate or 2-acrylamido-2-methyl propanesulfonic acid or salts thereof or combinations thereof; e) from 0.1 to 5 weight percent ureido methacrylate; and f) 0 weight percent of a phosphorus acid monomer.

The volume average particle size of the second seed polymer particles, as measured by a BI-90 Dynamic Light Scattering Particle Analyzer, is from 20, preferably from 30 nm, more preferably from 40 nm, to 80 nm, preferably to 70 nm, and more preferably to 60 nm.

The aqueous dispersions of the first and second seed polymer particles are mixed together at a first-to-second seed polymer particles weight-to-weight ratio of preferably from 1:2, more preferably from 1:1, to preferably 10:1, more preferably 5:1, and most preferably to 3:1. The mixture is then contacted with the monomers, preferably an aqueous emulsion of the monomers under emulsion polymerization conditions to form polymer particles with a protuberating phosphorus acid functionalized core and polymer particles without a protuberating core.

Preferably, the monomers have the same monomer profile as the second seed polymer particles, which means that the monomers that are used to prepare the second seed polymer are preferably the same and in the same proportions as the monomers in the monomer emulsion. The subsequently formed shells of the protuberating polymer particles and the particles without protuberating cores have substantially identical compositions: They are identical when the monomer profile of the monomers is the same as the second seed polymers, and almost identical when the profiles are different.

In a most preferred method of making the bimorphological composition, a portion of the monomer emulsion (~1 to 10 weight percent of the total monomers in the monomer emulsion) is polymerized under emulsion polymerization conditions to form the aqueous dispersion of the second seed polymer particles. Alternatively, the first and second seed polymer particles can be formed independently in separate reactors. In either case, the first and second seeds must have different compositions to form the bimorphological latex.

The aqueous dispersions of the first and second seed polymer particles are then combined, followed by addition of the remainder of the monomer emulsion, followed by emulsion polymerization. The concentration of first seed polymer particles is preferably from 1, more preferably from 2.5, to 20, more preferably to 10 weight percent based on the weight of the total monomers in the subsequently added monomer emulsion.

The resultant dispersion of bimorphological polymer particles, that is, polymer particles with and without a phosphorus acid functionalized protuberating core, preferably have a weight-to-weight ratio of particles with a protuberating core to particles without a protuberating core in the range of from 30:70, more preferably from 50:50, most preferably from 55:45, to preferably 68:32, and more preferably to 65:35. The volume average particle size of the polymer particles with the protuberating core is in the range of from 110, preferably from 120 nm to 160, preferably to 150 nm; and the volume average particle size of the particles without a protuberating core is in the range of from 70, more preferably from 80, and most preferably from 85 nm, to 140, more preferably to 130 nm, as determined by Asymmetric Flow Field Flow Fractionation. Preferably, the ratio of the volume average particle size of the protuberating core particles to the non-protuberating core particles is from 1.45:1, more preferably from 1.42:1, to 0.9:1, more preferably to 1:1, more preferably to 1.1:1, and most preferably to 1.2:1.

The aqueous dispersion of bimorphological particles is advantageously combined with $TiO_2$ particles to form a dispersion of first polymer particles, at least some of which adsorb to the $TiO_2$ particles, and second polymer particles, at least some of which do not adsorb to the $TiO_2$ particles.

The composite can be prepared by mixing the aqueous dispersion of the phosphorus acid functionalized polymer particles with $TiO_2$ particles in any order and optionally in the presence of other ingredients used in a paint formulation. The preferred concentration of the composite particles in the composition is from 20 to 40 weight percent, based on the weight of the composition.

The associative thickener, preferably the hydrophobically modified alkylene oxide urethane polymer rheology modifier, more preferably the HEUR, is advantageously combined with the aqueous dispersion of the composite and other ingredients selected from the group consisting of dispersants, defoamers, surfactants, solvents, non-phosphorus acid functionalized binders, additional thickeners, extenders, coalescents, biocides, and colorants.

A water-based paint formulation that contains the above-described composite and associative thickener has a Stormer viscosity that is sufficiently low that a formulator can add from 0.2 to 4.0 dry lbs/100 gal (0.2 g to 4.8 dry g/L) of KU builder to increase Stormer viscosity to the desired level. KU builders offer performance advantages in formulated paints through improved heat age stability, viscosity retention upon tinting, in-can feel, and syneresis resistance. The flexibility to choose from a range of KU builders for a given formulation is also advantageous for tailoring sag resistance and the flow/leveling performance.

EXAMPLES

Abbreviations
Acrylic Acid AA
Allyl Methacrylate ALMA
Butyl Acrylate BA
CARBOWAX™ 8000 Polyethylene Glycol PEG 8000
DESMODUR W Diisocyanate $H_{12}MDI$
Hexamethylene diisocyanate HDI
Isophorone diisocyanate IPDI
Butylated Hydroxytoluene BHT
Methacrylic Acid MAA
Methyl Methacrylate MMA
Phosphoethylmethacrylate PEM
Pigment Volume Concentration PVC
Ureido Methacrylate UMA
Sodium 4-vinylbenzenesulfonate SVBS
Volume Solids VS
ACRYSOL™ RM-995 Rheology Modifier RM-995
ACRYSOL and CARBOWAX are Trademarks of The Dow Chemical Company or Its Affiliates.

Intermediate 1

Preparation of PEM-Functionalized Latex Binder with Acorn Morphology

A. Core (Pre-form) Synthesis

A first monomer emulsion was prepared by mixing deionized water (200 g), Disponil FES 993 surfactant (43 g, 30% active), BA (371 g), MMA (195 g), ALMA (9.6 g), PEM (51.2 g, 60% active), and MAA (12.8 g).

To a 5-L, four necked round bottom flask equipped with a paddle stirrer, a thermometer, nitrogen inlet, and a reflux condenser was added deionized water (600 g) and Disponil FES 32 surfactant (43 g, 30% active). The contents of the flask were heated to 85° C. under nitrogen, and stirring was initiated. A portion of the first monomer emulsion (70 g) was then added, quickly followed by a solution of sodium persulfate (2.56 g) dissolved in deionized water (30 g) followed by a rinse of deionized water (5 g). After stirring for 10 min, the remainder of the first monomer emulsion, followed by a rinse (25 g), and an initiator solution of sodium persulfate (0.64 g) dissolved in deionized water (50 g) were added linearly and separately over 40 min. After the monomer emulsion feed was complete, the contents of the flask were held at 85° C. for 10 min, after which time the co-feed was complete; and the contents of the flask were then held at 85° C. for an additional 10 min. The contents of the flask were cooled to room temperature and neutralized to pH 3 with a dilute solution of ammonium hydroxide. The measured particle size was 60-75 nm and the solids were 40-41%.

B. Acorn Core-Shell Synthesis

A second monomer emulsion was prepared using deionized water (400 g), sodium dodecylbenzene sulfonate (55.4 g, 23% active), Disponil FES 993 surfactant (48.2 g, 30% active), BA (775 g), MMA (797 g), UMA (44.2 g, 50% active), AA (10.2 g), and SVBS (11.3 g, 90% active).

To a 5-L, four necked round bottom flask equipped with a paddle stirrer, a thermometer, nitrogen inlet, and a reflux condenser was added deionized water (850 g) and Disponil FES 993 surfactant (5.65 g, 30% active). The contents of the flask were heated to 84° C. under nitrogen and stirring was initiated. A portion of the second monomer emulsion (75 g) was then added, quickly followed by an aqueous solution of ammonium persulfate (5.1 g) dissolved in deionized water (25 g) followed by a rinse of deionized water (5 g). After stirring for 10 min, the pre-form from Step A was then added (212.5 g), followed by addition of the second monomer emulsion and then a solution containing ammonium persulfate (1.7 g) and ammonium hydroxide (5 g, 29% active) dissolved in deionized water (55 g), each added linearly and separately to the flask over a total period of 80 min. The contents of the flask were maintained at a temperature of 84° C. during the addition of the second monomer emulsion. When all additions were complete, the flask containing the second monomer emulsion was rinsed with deionized water (25 g), which was then added to the flask.

The contents of the flask were cooled to 65° C. and a catalyst/activator pair was added to the flask to reduce residual monomer. TERGITOL™ 15-S-40 surfactant (12.2 g, 70% solids) was added. The polymer was then neutralized to pH 9 with a dilute ammonium hydroxide solution. The measured particle size was 120 nm using a Brookhaven BI-90 Plus particle size analyzer and the measured solids were typically 49-50%.

RM1—Preparation of a Rheology Modifier with c Log P of 4.34

PEG 8000 (1751.1 g) was heated to 110° C. in vacuo in a batch melt reactor for 2 h. The reaction mixture was cooled to 85° C. BHT (0.184 g) and 1-octanol (29.66 g) were added to the reactor and the reaction mixture was stirred for 5 min. HDI (52.68 g) was then added to the reactor followed by 5 min of stirring. Bismuth octoate (28% Bi, 4.38 g) was then added to the reactor and the resulting mixture was stirred for 10 min at 85° C. The resulting molten polymer was removed from the reactor and cooled. Prior to testing in coating formulations, portions of this solid polymer were then dissolved in water to form a solution containing 25 wt % polymer based on the total weight of the solution.

RM2—Preparation of a Rheology Modifier with c Log P of 4.87

PEG 8000 (1738.9 g) and LUMULS POE (26) glycerine (44.36 g) were heated to 110° C. in vacuo in a batch melt reactor for 2 h. After cooling the reactor contents to 85° C., BHT (0.188 g), 1-nonanol (36.24 g), and HDI (60.36 g) were added sequentially to the reactor and allowed to mix for 5 min. Bismuth octoate (28% Bi, 4.35 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 20 wt % polymer based on the total weight of the solution.

RM3—Preparation of a Rheology Modifier with c Log P of 5.74

PEG 8000 (1711.9 g) was heated to 110° C. in vacuo in a batch melt reactor for 2 h. While maintaining a reaction temperature of 110° C., BHT (0.182 g) and hexanol (18.91 g) were added to the reactor and the reaction mixture was stirred for 5 min. $H_{12}MDI$ (77.85 g) was then added to the reactor followed by 5 min of stirring. Bismuth octoate (28% Bi, 4.28 g) was then added to the reactor and the resulting mixture was stirred for 10 min at 110° C. Subsequently, hexanol (3.26 g) was added to the reactor and mixing continued for another 10 minutes at 110° C. The resulting molten polymer was removed from the reactor and cooled. Prior to testing in coating formulations, portions of this solid polymer were then dissolved in water to form a solution containing 20 wt % polymer based on the total weight of the solution.

RM4—Preparation of a Rheology Modifier with c Log P of 5.40

PEG 8000 Polyethylene Glycol (1700.0 g) and LUMULSE POE (26) glycerine (43.36 g) were heated to 110° C. in vacuo in a batch melt reactor for 2 h. After cooling the reactor contents to 85° C., BHT (0.185 g), 1-decanol (38.88 g), and HDI (59.01 g) were added sequentially to the reactor and allowed to mix for 5 min. Bismuth octoate (28% Bi, 4.25 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 18.5 wt % polymer based on the total weight of the solution.

RM5—Preparation of a Rheology Modifier with c Log P of 6.33

PEG 8000 (1854.8 g) and LUMULSE POE (26) glycerine (46.60 g) were heated to 110° C. in vacuo in a batch melt reactor for 2 h. After cooling the reactor contents to 85° C., BHT (0.202 g), 2-butyl-1-octanol (47.81 g), and HDI (63.41 g) were added sequentially to the reactor and allowed to mix for 5 min. Bismuth octoate (28% Bi, 4.64 g) was then added to the reactor and the temperature of the mixture was maintained at 85° C. with stirring for 20 min. The resulting molten polymer was removed from the reactor and cooled. Prior to testing in coating formulations, portions of this solid polymer were then dissolved in water to form a solution containing 17.5 wt % polymer based on the total weight of the solution.

Example 1

Paint Thickened with RM1 at 18% PVC, 35.6% VS

A. Premix

Intermediate 1 (688 g), water (227 g), KRONOS 4311 TiO$_2$ slurry (660 g, 76.5% solids), and ammonia (4.5 g) were mixed using an overhead mixer for 8 min. Binder 1 (655 g), BYK-348 surfactant (7.7 g), FOAMSTAR A-34 defoamer (3.3 g), water (60 g) and TEXANOL coalescent (19.7 g) were then added sequentially and mixed for an additional 5 min.

B. Letdown

Premix (193.4 g), water (4.17 g), RM1 (5.62 g, 25% solids), and ACRYSOL™ RM-995 Rheology Modifier (0.70 g, 20% solids) were mixed together using an overhead mixture for 10 to 15 min to complete the formulation.

Example 2

Paint Thickened with RM2 at 18% PVC, 35.6% VS

A. Premix

The premix was prepared the same as described in Example 1, Part A.

B. Letdown

Premix (193.4 g), water (5.80 g), RM2 (4.511 g, 20% solids), and ACRYSOL™ RM-995 Rheology Modifier (0.18 g, 20% solids) were mixed together using an overhead mixture for 10 to 15 min to complete the formulation.

Comparative Example 1

Paint Thickened with RM3 at 18% PVC, 35.6% VS

A. Premix

The premix was prepared the same as described in Example 1, Part A.

B. Letdown

Premix (193.4 g), water (4.04 g) and RM3 (6.45 g, 20% solids) were mixed together using an overhead mixture for 10 to 15 min to complete the formulation.

Comparative Example 2

Paint Thickened with RM4 at 18% PVC, 35.6% VS

A. Premix

The premix was prepared the same as described in Example 1, Part A.

B. Letdown

Premix (193.4 g), water (6.11 g), and RM4 (4.38 g, 18.5% solids) were mixed together using an overhead mixture for 10 to 15 min to complete the formulation.

Comparative Example 3

Paint Thickened with RM5 at 18% PVC, 35.6% VS

A. Premix

The premix was prepared the same as described in Example 1, Part A.

B. Letdown

Premix (193.4 g), water (7.03 g), and RM5 (3.46 g, 17.5% solids) were mixed together using an overhead mixture for 10 to 15 min to complete the formulation.

Example 3

Paint Thickened with RM1 at 18% PVC, 38.9% VS

A. Premix

Intermediate 1 (477 g), water (74.2 g), and KRONOS 4311 TiO$_2$ slurry (360 g, 76.5% solids), were mixed using an overhead mixer for 8 min. Intermediate 1 (259 g), BYK-348 surfactant (4.2 g), FOAMSTAR A-34 defoamer (1.8 g), and TEXANOL coalescent (10.5 g) were then added sequentially and mixed for an additional 5 min.

B. Letdown

Premix (197.8 g), water (5.74 g), RM1 (3.09 g, 25% solids), and ACRYSOL™ RM-995 Rheology Modifier (0.35 g, 20% solids) were mixed together using an overhead mixture for 10 to 15 min to complete the formulation.

Comparative Example 4

Paint Thickened with RM3 at 18% PVC, 38.9% VS

A. Premix

The premix was prepared the same as described in Example 3, Part A.

B. Letdown

Premix (197.8 g), water (6.02 g), and RM3 (3.16 g, 20% solids) were mixed together using an overhead mixture for 10 to 15 min to complete the formulation.

Comparative Example 5

Paint Thickened with RM4 at 18% PVC, 38.9% VS

A. Premix

The premix was prepared the same as described in Example 3, Part A.

B. Letdown

Premix (197.8 g), water (6.58 g), and RM4 (2.60 g, 18.5% solids) were mixed together using an overhead mixture for 10 to 15 min to complete the formulation.

Table 1 illustrates KU and ICI viscosities (KU η and ICI η respectively) for amounts of RM-995 thickener added to 18 PVC paint samples. The added thickener is RM-995 in dry lbs/100 gal.

TABLE 1

Viscosity Profiles for Thickener Added to 18 PVC Paints
Viscosity Measurements

| Sample No. | VS % | cLog P | RM-995 | RM# | KU η | ICI η (Pa · s) |
|---|---|---|---|---|---|---|
| Example 1 | 35.6 | 4.34 | 0.70 | 1 | 96.8 | 1.34 |
| Example 2 | 35.6 | 4.87 | 0.18 | 2 | 98.8 | 1.31 |
| Comp Ex 1 | 35.6 | 5.74 | 0.00 | 3 | 105.6 | 1.31 |
| Comp Ex 2 | 35.6 | 5.40 | 0.00 | 4 | 100.5 | 1.31 |
| Comp Ex 3 | 35.6 | 6.33 | 0.00 | 5 | 122.1 | 1.18 |
| Example 3 | 38.9 | 4.34 | 0.35 | 1 | 99.4 | 1.31 |
| Comp Ex 4 | 38.9 | 5.74 | 0.00 | 3 | 106.9 | 1.20 |
| Comp Ex 5 | 38.9 | 5.40 | 0.00 | 4 | 110.7 | 1.29 |

In all cases, the paint viscosity was targeted at 100±3 KU and 1.3±0.1 Pa·s. The data demonstrate that RM1, which has a c Log P of 4.34, accommodates the highest use levels of RM-995 without exceeding the Stormer viscosity target for both levels of VS studied. At 35.6% VS, RM2 also permits a low use level of RM-995, though noticeably reduced from the levels used with RM1. At 38.9% VS, only RM1 was shown to be effective with RM-995 as a co-thickener. RM3, RM4, and RM5, all of which have c Log P values>5.0, match or exceed the KU viscosity target without any RM-995 added when targeted to the same ICI viscosity. The ability to selectively add co-thickener to increase Stormer viscosity in the inventive paint formulations allows for enhanced flexibility toward designed rheology; this flexibility allow for the optimization of performance characteristics such as sag and leveling, viscosity stability, viscosity retention upon tinting, and colorant compatibility.

The invention claimed is:

1. A composition comprising an aqueous dispersion of a) from 0.02 to 2 weight percent, based on the weight of the composition, of an associative thickener having a hydrophobic portion with a calculated log P in the range of from 2.7 to 5.0; and b) from 5 to 60 weight percent, based on the weight of the composition, of composite particles comprising phosphorus acid functionalized polymer particles adsorbed to the surfaces of $TiO_2$ particles; wherein the volume solids content of the composition is in the range of from 30 to 44 volume percent, with the proviso that when the volume solids content is in the range of from 30 to 36 volume percent, the calculated log P of the hydrophobic portion of the associative thickener is in the range of from 4.0 to 5.0; wherein the phosphorus acid functionalized polymer particles have a core-shell morphology wherein the core protuberates from the shell.

2. The composition of claim 1 wherein the protuberating core of the phosphorus acid functionalized polymer particles comprises, based on the weight of the core: a) from 2 to 15 weight percent structural units of a phosphorus acid monomer; b) from 0.2 to 20 weight percent structural units of a carboxylic acid monomer or a salt thereof; c) from 0.1 to 30 weight percent structural units of a multiethylenically unsaturated monomer; d) from 5 to 60 weight percent structural units of methyl methacrylate or styrene or a combination thereof; and e) from 35 to 90 weight percent structural units of ethyl acrylate, butyl acrylate, or 2-ethylhexyl acrylate or a combination thereof;

wherein the shell of the phosphorus acid functionalized polymer particles comprises, based in the weight of the shell: a1) from 0.1 to 4 weight percent structural units of a sulfur acid monomer or a salt thereof; and b1) from 35 to 74.9 weight percent structural units of methyl methacrylate or styrene or a combination thereof; c1) from 25 to 64.9 weight percent structural units of butyl acrylate or ethyl acrylate or a combination thereof; and d1) less than 1 weight percent structural units of a phosphorus acid monomer or salt thereof; and wherein the shell-core weight-to-weight ratio is in the range of 3:1 to 50:1.

3. The composition of claim 2 wherein the protuberating core of the phosphorus acid functionalized polymer particles comprises from 5 to 10 weight percent structural units of phosphoethyl methacrylate, based on the weight of the core; and wherein the shell comprises less than 0.1 weight percent structural units of a phosphorus acid monomer, based on the weight of the shell.

4. The composition of claim 3 which further comprises a dispersion of polymer particles that do not have a protuberating core and which comprise from a) 0.1 to 4 weight percent structural units of a sulfur acid monomer or a salt thereof; b) from 35 to 74.9 weight percent structural units of methyl methacrylate or styrene or a combination thereof; and c) from 25 to 64.9 weight percent structural units of butyl acrylate or ethyl acrylate or a combination thereof.

5. The composition of claim 4 wherein the associative thickener comprises a polyether which is a hydrophobically modified ethylene oxide urethane polymer at a concentration of from 0.1 to 1 weight percent, based on the weight of the composition;

the polymer particles that do not have a protuberating core have the same composition as the composition of the shell of the phosphorus acid functionalized polymer particles;

wherein the weight-to-weight ratio of polymer particles with a protuberating core to particles without a protuberating core in the range of from 30:70 to 68:32; and wherein the polymer particles that do not have a protuberating core and the shell of the phosphorus acid functionalized polymer particles comprise less than 0.1 weight percent of structural units of a phosphorus acid monomer.

6. The composition of claim 5 wherein the volume solids content of the composition is in the range of from 30 to 36 volume percent; and wherein the associative thickener comprises a polyol which is a hydrophobically modified ethylene oxide urethane polymer having a hydrophobic portion with a calculated log P in the range of from 4.0 to 4.8.

7. The composition of claim 5 wherein the volume solids content of the composition is in the range of from 36 to 44 volume percent; and wherein the associative thickener comprises a polyether which is a hydrophobically modified ethylene oxide urethane polymer having a hydrophobic portion with a calculated log P in the range of from 3.5 to 4.8.

8. The composition of claim 6 wherein the hydrophobic portion of the hydrophobically modified ethylene oxide urethane polymer is represented by the following structure:

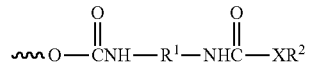

wherein X is O or $NR^{2'}$ with the proviso that
X is O and $R^1$ is $-H_{12}MDI-$ when $R^2$ is $CH_3(CH_2)_3-$ or $CH_3(CH_2)_2-$; or
X is O and $R^1$ is -IPDI- when $R^2$ is $CH_3(CH_2)_5-$ or $CH_3(CH_2)_4-$; or
X is O and $R^1$ is -HDI- when $R^2$ is $CH_3(CH_2)_7-$; or
X is $NR^{2'}$ and $R^1$ is $-H_{12}MDI-$ when $R^2$ is benzyl and $R^1$ is $CH_3-$; or
X is $NR^{2'}$ and $R^1$ is $-H_{12}MDI-$ when $R^2$ is cyclohexyl and $R^{2'}$ is H; or
X is $NR^{2'}$ and $R^1$ is -IPDI- when $R^2$ is $CH_3(CH_2)_5-$ and $R^{2'}$ is H.

9. The composition of claim 4 wherein the associative thickener has a hydrophobic portion represented by $\sim\sim O-R^3$, where $R^3$ is n-undecyl, n-decyl, n-nonyl, n-octyl, 2-ethylhexyl, 3,5,5-trimethylhexyl, 3,7-dimethyloctyl, dibenzylaminoethyl, 2-propylheptyl, diamylaminoethyl, n-octylphenyl, or 2,6-dimethylheptyl.

10. The composition of claim 7 wherein the hydrophobic portion of the hydrophobically modified ethylene oxide urethane polymer is represented by the following structure:

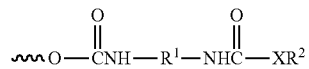

wherein X is O or $NR^{2'}$ with the proviso that
X is O and $R^1$ is $-H_{12}MDI-$ when $R^2$ is $CH_3(CH_2)_3-$ or $CH_3(CH_2)_2-$; or X is O and $R^1$ is -IPDI- when $R^2$ is $CH_3(CH_2)_5$— or $CH_3(CH_2)_4$— or $CH_3(CH_2)_4$— or benzyl; or X is O and $R^1$ is -HDI- when $R^2$ is $CH_3(CH_2)_7$— or $CH_3(CH_2)_6$—; or X is $NR^{2'}$ and $R^1$ is -$H_{12}$MDI- when $R^2$ is benzyl and $R^{2'}$ is $CH_3$—; or X is $NR^{2'}$ and $R^1$ is -$H_{12}$MDI- when $R^2$ is cyclohexyl and $R^{2'}$ is H; or X is $NR^{2'}$ and $R^1$ is -IPDI- when $R^2$ is $CH_3(CH_2)_5$— and $R^{2'}$ is H; or X is $NR^{2'}$ and $R^1$ is -IPDI- when $R^2$ and $R^{2'}$ are butyl.

11. The composition of claim 5 wherein the hydrophobic portion of the hydrophobically modified ethylene oxide urethane polymer is represented by the following structure:

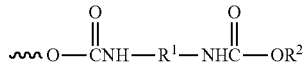

wherein $R^1$ is -HDI- when $R^2$ is $CH_3(CH_2)_7$—O—.

* * * * *